United States Patent
Bai

(10) Patent No.: US 10,554,243 B2
(45) Date of Patent: Feb. 4, 2020

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/183,714

(22) Filed: Nov. 7, 2018

(65) Prior Publication Data

US 2019/0288733 A1     Sep. 19, 2019

(30) Foreign Application Priority Data

Mar. 16, 2018   (CN) .......................... 2018 1 0220508

(51) Int. Cl.
*H04B 1/40*       (2015.01)
*H04B 1/00*       (2006.01)
(Continued)

(52) U.S. Cl.
CPC .............. *H04B 1/40* (2013.01); *H04B 1/005* (2013.01); *H04B 7/0404* (2013.01);
(Continued)

(58) Field of Classification Search
CPC ........ H04B 1/40; H04B 7/0404; H04B 1/005; H04B 7/0686; H01Q 7/00; H04W 88/06
(Continued)

(56) References Cited

U.S. PATENT DOCUMENTS

2009/0054093 A1    2/2009  Kim et al.
2013/0308554 A1   11/2013  Ngai et al.
(Continued)

FOREIGN PATENT DOCUMENTS

CN      101867402 A    10/2010
CN      103905104 A     7/2014
(Continued)

OTHER PUBLICATIONS

Gao Xiang et al: "Multi-switch for Antenna Selection in Massive MIMO", 2015 IEEE Global Communications Conference (GlobeCom), IEEE, Dec. 6, 2015.
(Continued)

*Primary Examiner* — Juan A Torres
(74) *Attorney, Agent, or Firm* — Young Basile Hanlon & MacFarlane, P.C.

(57) ABSTRACT

A multiway switch, a radio frequency system, and a wireless communication device include four throw (T) ports and four pole (P) ports, and the four T ports include one first T port coupled with all of the four P ports. The multiway switch is configured to be coupled with a radio frequency circuit and an antenna system of an electronic device operable in a dual-frequency single-transmit mode, to enable a preset function of the electronic device, the antenna system includes four antennas corresponding to the four P ports, and the preset function is a function of transmitting a sounding reference signal (SRS) through the four antennas in turn.

20 Claims, 13 Drawing Sheets

(51) Int. Cl.
  *H04B 7/0404* (2017.01)
  *H04B 7/06* (2006.01)
  *H01Q 7/00* (2006.01)
  *H04W 88/06* (2009.01)

(52) U.S. Cl.
  CPC ............ *H04B 7/0686* (2013.01); *H01Q 7/00* (2013.01); *H04W 88/06* (2013.01)

(58) Field of Classification Search
  USPC ........................................................ 375/267
  See application file for complete search history.

(56) References Cited

U.S. PATENT DOCUMENTS

| | | |
|---|---|---|
| 2014/0227982 A1 | 8/2014 | Granger-Jones et al. |
| 2016/0065206 A1* | 3/2016 | Ho ..................... H04L 25/0266 455/83 |
| 2017/0195004 A1 | 7/2017 | Cheng et al. |
| 2019/0097715 A1* | 3/2019 | Maldonado ............ H03F 3/189 |

FOREIGN PATENT DOCUMENTS

| | | |
|---|---|---|
| CN | 105245295 A | 1/2016 |
| CN | 106559277 A | 4/2017 |
| CN | 106685621 A | 5/2017 |
| CN | 106792938 A | 5/2017 |
| WO | 2012026601 A1 | 3/2012 |

OTHER PUBLICATIONS

Lemieux G et al: "Generating Highly-Routable Sparse Crossbars for PLDS", FPGA' 00. ACM/SIGDA International Symposium on Field Programmable Gate Arrays, Monterey, CA, Feb. 9-11, 20; [ACM/SIGDA International Symposium on Field Programmable Gate Arrays], New York, NY: ACM, US, vol. CONF.8, Jan. 1, 2000.
Extended European search report issued in corresponding European application No. 18205240.7 dated May 28, 2019.
International search report issued in corresponding international application No. PCT/CN2018/113764 dated Jan. 30, 2019.

\* cited by examiner

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220508.0, filed on Mar. 16, 2018, the entire disclosure of which is hereby incorporated by reference.

TECHNICAL FIELD

This disclosure relates to the field of mobile terminal technologies, and more particularly to a multiway switch, a radio frequency system, and a wireless communication device.

BACKGROUND

With the popularity of electronic devices such as smart phones, the smart phone can support an increasing number of applications and is becoming more and more powerful. The smart phone is developing in a diversified and personalized way, becoming an indispensable electronic product in users' life. In the fourth generation (4G) mobile communication system, the electronic device generally adopts a single-antenna or dual-antenna radio frequency (RF) system architecture. Currently, in a new radio (NR) system of the fifth generation (5G) mobile communication system, requirements on an electronic device supporting a four-antenna RF system architecture are proposed.

SUMMARY

Implementations of the disclosure provide a multiway switch, a radio frequency system, and a wireless communication device.

According to a first aspect of the disclosure, a multiway switch is provided. The multiway switch includes four throw (T) ports and four pole (P) ports. The four T ports include one first T port coupled with all of the four P ports.

The multiway switch is configured to be coupled with a radio frequency circuit and an antenna system of an electronic device operable in a dual-frequency single-transmit mode, to enable a preset function of the electronic device, the antenna system includes four antennas corresponding to the four P ports, and the preset function is a function of transmitting an SRS through the four antennas in turn.

According to a second aspect of the disclosure, a radio frequency system is provided. The radio frequency system includes an antenna system, a radio frequency transceiver, a radio frequency circuit coupled with the radio frequency transceiver, and a multiway switch coupled with the radio frequency circuit and the antenna system. The multiway switch includes four T ports and four P ports. The four T ports include one first T port at least supporting a transmission function and three second T ports supporting only a reception function. The first T port is coupled with all of the four P ports. The antenna system includes four antennas corresponding to the four P ports.

The multiway switch is configured to enable a preset function of transmitting an SRS through the four antennas in turn.

According to a third aspect of the disclosure, a wireless communication device is provided. The wireless communication device includes a radio frequency transceiver, a radio frequency circuit coupled with the radio frequency transceiver, an antenna system, and a multiway switch coupled with the radio frequency circuit and the antenna system. The multiway switch includes four T ports and four P ports. The four T ports include one first T port coupled with all of the four P ports. The antenna system includes four antennas corresponding to the four P ports.

The multiway switch is configured to enable a preset function of transmitting an SRS through the four antennas in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
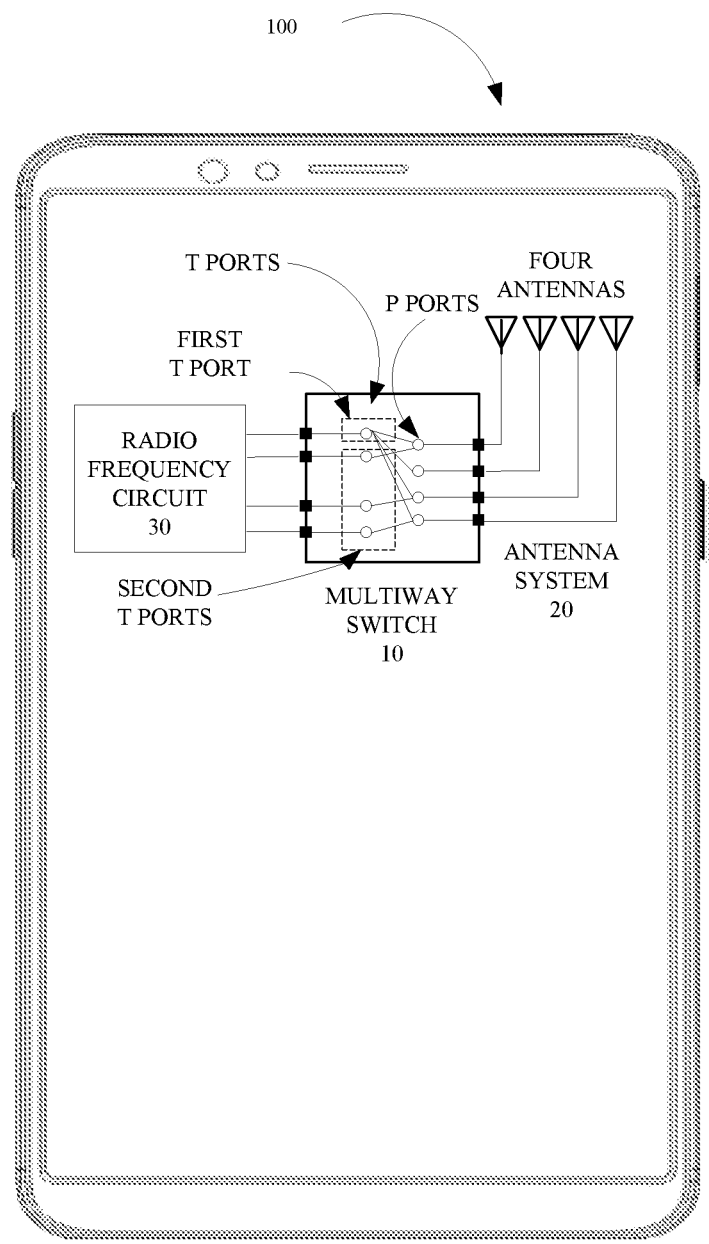
FIG. 1 is a schematic structural diagram illustrating a multiway switch according to an implementation of the present disclosure.

Technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompanying drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The electronic device involved in the implementations of the disclosure may include various handheld devices, in-vehicle devices, wearable devices, computing devices that have wireless communication functions or other processing devices connected to wireless modems, as well as various forms of user equipments (UE), mobile stations (MS), terminal devices, and the like. For the convenience of description, the above-mentioned devices are collectively referred to as an electronic device.

At present, sounding reference signal (SRS) switching in four antennas switching of a mobile phone is a mandatory option for the China mobile communications corporation (CMCC) in the China mobile fifth generation (5G) Scale Test Technology White Paper_Terminal, which is optional in the third generation partnership project (3GPP). Its main purpose is for a base station to determine quality and parameters of four channels via measuring uplink signals of four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

To satisfy requirements of SRS switching in four antennas switching, a radio frequency architecture based on a simplified four-pole n-throw (4PnT) antenna switch is proposed in the implementations of the disclosure. Compared with a 3P3T/DPDT/multiway small switch switching scheme, the present switching scheme can reduce the number of series switches in each path by integrating all or part of switches into the 4PnT switch, thereby reducing link loss and optimizing the overall transmission and reception performance of the terminal. The implementations of the present application are described in detail below.

In the context of the disclosure, "P port" is the abbreviation of "pole port", which refers to ports coupled with antennas of a multiway switch. "T port" is the abbreviation of "throw port", which refers to ports coupled with radio frequency modules of the multiway switch. The multiway switch is a four-pole four-throw (4P4T) switch for example. "Module" can refer to circuits and any combination of related components.

In the context of the disclosure, the abbreviation "LNA" refers to a low-noise amplifier and the abbreviation "PA" refers to a power amplifier.

According to an implementation of the disclosure, a multiway switch is provided. The multiway switch includes four T ports and four P ports. The four T ports include one first T port coupled with all of the four P ports. The multiway switch is configured to be coupled with a radio frequency circuit and an antenna system of an electronic device operable in a dual-frequency single-transmit mode, to enable a preset function of the electronic device. The antenna system includes four antennas corresponding to the four P ports. The preset function is a function of transmitting an SRS through the four antennas in turn.

According to an implementation of the disclosure, a radio frequency system is provided. The radio frequency system includes an antenna system, a radio frequency transceiver, a radio frequency circuit coupled with the radio frequency transceiver, and a multiway switch coupled with the radio frequency circuit and the antenna system. The multiway switch includes four T ports and four P ports. The four T ports include one first T port at least supporting a transmission function and three second T ports supporting only a reception function. The first T port is coupled with all of the four P ports. The antenna system includes four antennas corresponding to the four P ports. The multiway switch is configured to enable a preset function of transmitting an SRS through the four antennas in turn.

According to an implementation of the disclosure, a wireless communication device is provided. The wireless communication device includes a radio frequency transceiver, a radio frequency circuit coupled with the radio frequency transceiver, an antenna system, and a multiway switch coupled with the radio frequency circuit and the antenna system. The multiway switch includes four T ports and four P ports. The four T ports include one first T port coupled with all of the four P ports. The antenna system includes four antennas corresponding to the four P ports. The multiway switch is configured to enable a preset function of transmitting an SRS through the four antennas in turn.

FIG. 1 is a schematic structural diagram illustrating a multiway switch 10 according to an implementation of the present disclosure. As illustrated in FIG. 1, the multiway switch 10 is applicable to an electronic device 100, the electronic device 100 is operable in a dual-frequency single-transmit mode and includes an antenna system 20 and a radio frequency circuit 30. The antenna system 20 includes four antennas. The multiway switch 10 includes four T ports and four P ports. The four T ports include one first T port coupled with all of the four P ports (that is, fully-coupled). The four antennas correspond to the four P ports; specifically, the four antennas and the four P ports are in one-to-one correspondence.

The multiway switch 10 is configured to be coupled with the radio frequency circuit 30 and the antenna system 20 to implement a preset function of the electronic device 100, and the preset function is a function of transmitting an SRS through the four antennas corresponding to the four P ports in turn.

Since four T ports are included, the 4PnT multiway switch is simplified to 4P4T in implementations of the present disclosure.

The transmit antennas refer to antennas supporting a transmission function (that is, a signal transmission function) of the four antennas.

The concept of coupling, full coupling, or other kinds of coupling between the T ports and the P ports of the multiway switch described in the implementations of the disclosure refers to a state in which the T ports are coupled with the P ports through first switch transistors. The concept of "full coupling" (fully coupled) of the T ports and the P ports of the multiway switch described in the implementations of the disclosure refers to a state in which the T ports are coupled with all of the P ports through first switch transistors. For example, a first T port is fully coupled with four P ports, which means the first T port is coupled with all of the four P ports. It should be noted that, one T port or one P port may be one port of a second switch transistor. The first switch transistors are configured to control a unidirectional conduction state between the T ports and the P ports (i.e., a unidirectional conduction state from the T ports to the P ports or from the P ports to the T ports). The first switch transistor can be, for example, a switch array composed of three metal-oxide-semiconductor (MOS) transistors. When the first switch transistor is disconnected and not grounded, parasitic parameters will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. The second switch transistor is configured to enable a corresponding port (i.e., a T port or a P port) and can be, for example, a MOS transistor. It should be noted that, the specific configurations of the first switch transistor and the second switch transistor are not limited herein. In an implementation, the electronic device can control paths between the T port and the P port to switch on through the first switch transistor. As an implementation, the electronic device can be provided with a dedicated controller to be coupled with switch transistors of the multiway switch.

The transmitting an SRS through the four antennas corresponding to the four P ports in turn refers to a process in which an electronic device interacts with a base station based on a polling mechanism to determine quality of an uplink channel corresponding to each antenna.

The electronic device can be a mobile phone or other terminal devices supporting the fifth generation new radio (5G NR), such as a customer premise equipment (CPE) or a portable broadband wireless device (for example, a mobile WiFi, MIFI).

The dual-frequency single-transmit mode above refers to an operating mode in which the electronic device can support dual frequency band-one uplink (UL) transmit path or dual frequency band-four downlink (DL) receive paths.

The first T port is a port fully coupled with the four P ports. The four T ports further include second T ports, and each of the second T ports is coupled with one of the four P ports.

In addition, the electronic device further includes a radio frequency transceiver. The radio frequency transceiver is coupled with the radio frequency circuit and constitutes a radio frequency system of the electronic device together with the radio frequency circuit, the multiway switch, and the antenna system.

In an implementation, the electronic device further includes a radio frequency transceiver. The radio frequency transceiver is coupled with the radio frequency circuit and constitutes a radio frequency system of the electronic device together with the radio frequency circuit, the multiway switch, and the antenna system.

Figure 2:
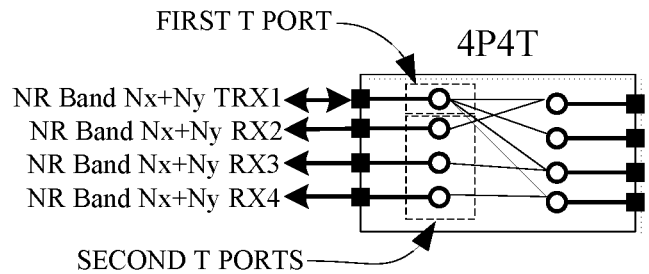
FIG. 2 is a schematic structural diagram illustrating a 4P4T multiway switch according to an implementation of the present disclosure.

FIG. 2 is a schematic structural diagram illustrating a multiway switch. "NR Band Nx" indicates a first frequency band. "NR Band Ny" indicates a second frequency band. "TRX1" represents a first T port that supports a transmission-reception function. "RX2" represents a second T port 2 supporting a reception function, "RX3" represents a second T port 3 supporting a reception function, and "RX4" represents a second T port 4 supporting a reception function.

In this implementation, the electronic device includes the antenna system, the radio frequency circuit, and the multiway switch. The antenna system includes the four antennas. The multiway switch includes the four T ports and the four P ports. The multiway switch is configured to be coupled with the radio frequency circuit and the antenna system to enable a function of the electric device of transmitting an SRS through the four antennas corresponding to the four P ports in turn.

In one possible implementation, the four T ports further include three second T ports. Each of the three second T ports is coupled with one of the four P ports, and among the three second T ports, second T ports operable at the same frequency band are coupled with different P ports of the four P ports. Each of the four P ports is coupled with a corresponding antenna of the four antennas. The first T port at least supports a transmission function and the three second T ports only support a reception function.

Among the three second T ports, second T ports operable at the same frequency band are coupled with different P ports of the four P ports (in other words, any two T ports of same frequency band are coupled with different P ports). The expression of "the first T port at least supporting a transmission function" refers to the first T port supporting at least one of a transmission-reception function (that is, a signal transmission-reception function) and a transmission function, in other words, the first T port supports a transmission-reception function, a transmission function, or a transmission-reception function and a transmission function.

When the electronic device is in a downlink 4*4 multiple-input multiple-output (MIMO) mode, the four T ports in receiving state at the same frequency band are coupled with the four P ports in one-to-one correspondence.

In this implementation, since the multiway switch includes the first T port and the three second T ports, in comparison with a configuration in which all T ports are fully coupled with P ports, for the multiway switch provided herein, the number of switches is reduced. That is, the number of the switches of transmit paths and/or receive paths of the radio frequency system of the electronic device can be reduced, thereby reducing path loss, improving transmit power/sensitivity, data transmission rate in the 5G NR, uplink and downlink coverage of the mobile phone, and reducing power consumption and cost.

In one possible implementation, the radio frequency circuit of the electronic device logically includes two transmitter circuits and eight receiver circuits. The radio frequency circuit physically includes one independent circuit module. The independent circuit module has one transmit-receive port and multiple receive ports. The transmit-receive port is configured to be coupled with the first T port. Each receive port is configured to be coupled with a corresponding second T port, that is, the multiple receive ports are configured to be coupled with multiple second T ports in one-to-one correspondence.

The transmit-receive port mentioned above is a port supporting a transmission-reception function and a transmission function, and each receive port is configured to be coupled with one second T port. The "transmit-receive port", "transmit port", or "receive port" refers to a port (may be composed of one or more components) which implements a corresponding transmission and/or reception function and is located on the path of a transmitter circuit, on the path of a receiver circuit, or located on the path after integration of one or more transmitter circuits and/or one or more receiver circuits. It should be noted that the ports such as transmit ports, receive ports, and transmit-receive ports illustrated in the figures are exemplary and do not intend to indicate an exact port position and impose any restrictions.

The radio frequency circuit described as separated modules may be physically separated or logically separated. The terms "physically" or "logically" therein may be adopted according to an actual need, to implement the objective of solutions provided in the disclosure. In other words, "physically" or "logically" can be equivalent to each other.

In one possible implementation, the independent circuit module is embodied as a first independent circuit module 310 including one first port and multiple second ports, the first port is configured to be coupled with the first T port of the multiway switch, and each second port is configured to be coupled with a corresponding second T port of the multiway switch (that is, one of the three second T ports of the multiway switch). The first independent circuit module 310 includes one transceiver integrated circuit and three receiver integrated circuits. The transceiver integrated circuit includes two transceiver circuits, and the two transceiver circuits have two transmit-receive ports coupled with the first port of the first independent circuit module 310. Each of the two transceiver circuits includes one receiver circuit and one transmitter circuit. Each of the three receiver integrated circuits includes two receiver circuits, and the two receiver circuits have two receive ports coupled with one of the second ports of the first independent circuit module 310.

Figure 3:
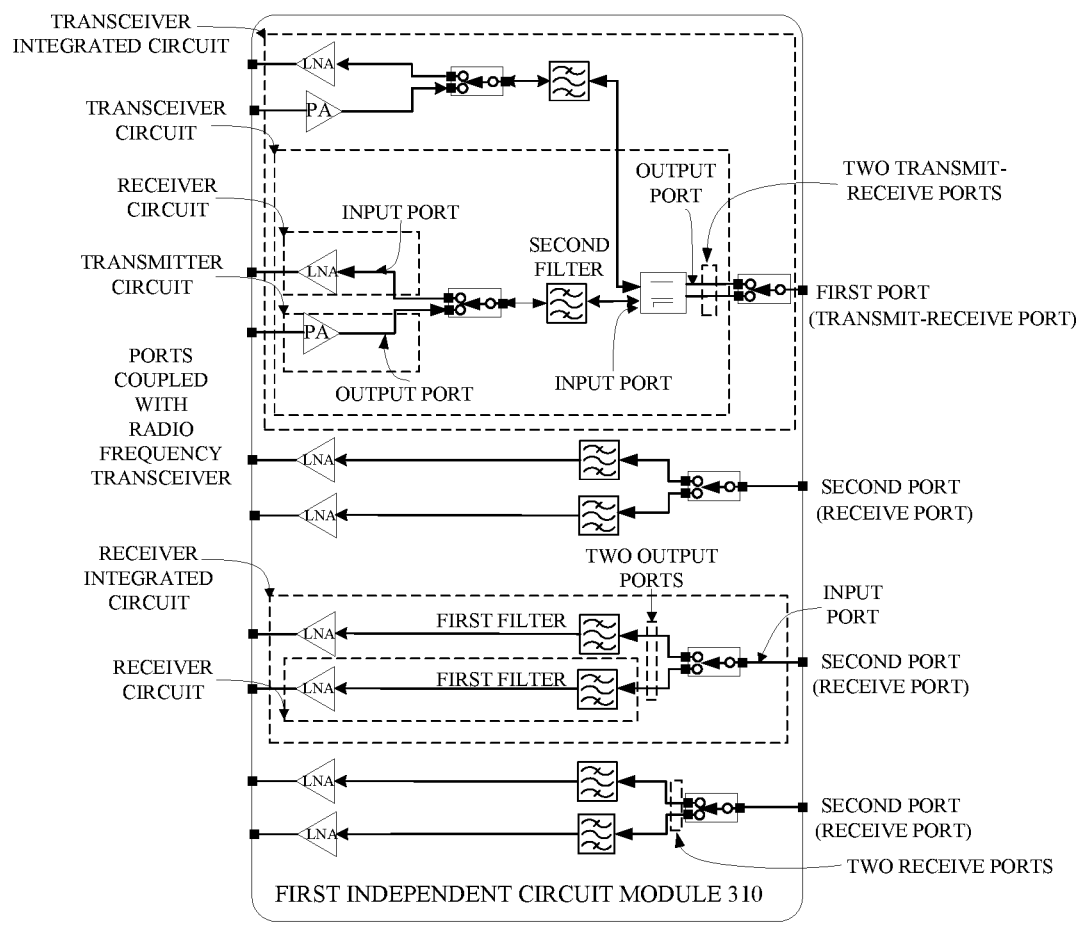
FIG. 3 is a schematic structural diagram illustrating a radio frequency circuit including one independent circuit module according to an implementation of the present disclosure.

As illustrated in FIG. 3, the radio frequency circuit includes one first independent circuit module 310. Since the dual-frequency single-transmit mode is supported in the disclosure, the two transmitter circuits belong to transmitter circuits operable at different frequency bands, and PAs of the two transmitter circuits cannot work at the same time. As a result, the two transmitter circuits at different frequency bands can be provided in the same independent circuit module.

It should be noted that, the receiver circuit and the transmitter circuit of each transceiver circuit are operable at the same frequency band, the transceiver circuits of the transceiver integrated circuit are operable at different frequency bands, and the two receiver circuits of the receiver integrated circuit are operable at different frequency bands.

In this implementation, for the electronic device operable in the dual-frequency single-transmit mode, the radio frequency circuit adapted to the multiway switch physically includes one independent circuit module, which is beneficial to reducing the use of electronic components, thereby simplifying the structure and reducing cost.

In some possible implementations, the radio frequency circuit of the electronic device logically includes two transmitter circuits and eight receiver circuits. The radio frequency circuit physically includes two independent circuit modules. The two independent circuit modules have one transmit-receive port and multiple receive ports. The transmit-receive port is configured to be coupled with the first T port. Each receive port is configured to be coupled with a corresponding second T port, that is, the multiple receive ports are configured to be coupled with multiple second T ports in one-to-one correspondence.

In this implementation, the radio frequency circuit physically includes two independent circuit modules, and each of the two independent circuit modules has a variety of possible configurations, which is beneficial to improving the diversity and flexibility of the physical configuration of the radio frequency circuit.

In one possible implementation, the two independent circuit modules are embodied as one first independent circuit module 410 and one second independent circuit module 420. The first independent circuit module 410 includes one first port configured to be coupled with the first T port of the multiway switch. The second independent circuit module 420 includes multiple second ports and each second port is configured to be coupled with a corresponding second T port of the multiway switch (that is, one of the three second T ports of the multiway switch).

The first independent circuit module 410 includes one transceiver integrated circuit. The transceiver integrated circuit includes two transceiver circuits, and the two transceiver circuits have two transmit-receive ports coupled with the first port of the first independent circuit module 410. Each of the two transceiver circuits includes one receiver circuit and one transmitter circuit.

The second independent circuit module 420 includes three receiver integrated circuits. Each of the three receiver integrated circuits includes two receiver circuits, and the two receiver circuits have two receive ports coupled with one of the second ports of the second independent circuit module 420.

Figure 4A:
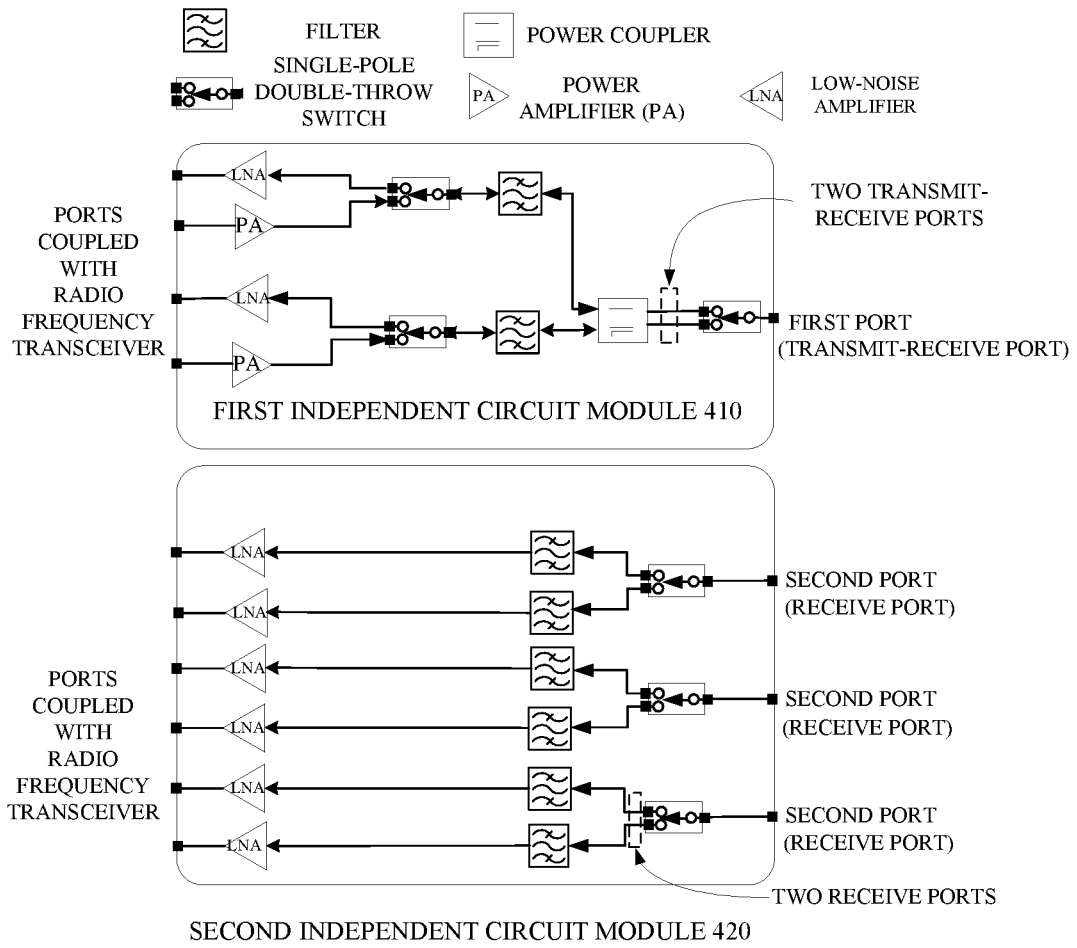
FIG. 4A is a schematic structural diagram illustrating a radio frequency circuit including two independent circuit modules according to an implementation of the present disclosure.

The radio frequency circuit including two independent circuit modules is illustrated in FIG. 4A. The transceiver integrated circuit is disposed in the first independent circuit module 410 separately, and the three receiver integrated circuits are disposed in the second independent circuit module 420 collectively.

In this implementation, the radio frequency circuit physically includes two independent circuit modules, and the two independent circuit modules are respectively configured with different types of processing circuits, which is beneficial to simplifying the radio frequency circuit and improving the reusability of different types of processing circuits.

In one possible implementation, the two independent circuit modules are embodied as one first independent circuit module 430 and one second independent circuit module 440. The first independent circuit module 430 includes one first port and one second port, the first port is configured to be coupled with the first T port of the multiway switch, and the second port of the first independent circuit module 430 is configured to be coupled with a corresponding second T port of the multiway switch (that is, one of the three second T ports of the multiway switch). The second independent circuit module 440 includes multiple second ports, and each second port of the second independent circuit module 440 is configured to be coupled with a corresponding second T port of the multiway switch (that is, one of the three second T ports of the multiway switch).

The first independent circuit module 430 includes one transceiver integrated circuit and one receiver integrated circuit. The transceiver integrated circuit includes two transceiver circuits, and the two transceiver circuits have two transmit-receive ports coupled with the first port of the first independent circuit module 430. Each of the two transceiver circuits includes one receiver circuit and one transmitter circuit. The receiver integrated circuit of the first independent circuit module 430 includes two receiver circuits, and the two receiver circuits have two receive ports coupled with the second port of the first independent circuit module 430.

The second independent circuit module 440 includes two receiver integrated circuits. Each of the two receiver integrated circuits of the second independent circuit module 440 includes two receiver circuits, and the two receiver circuits have two receive ports coupled with one of the second ports of the second independent circuit module 440.

Figure 4B:
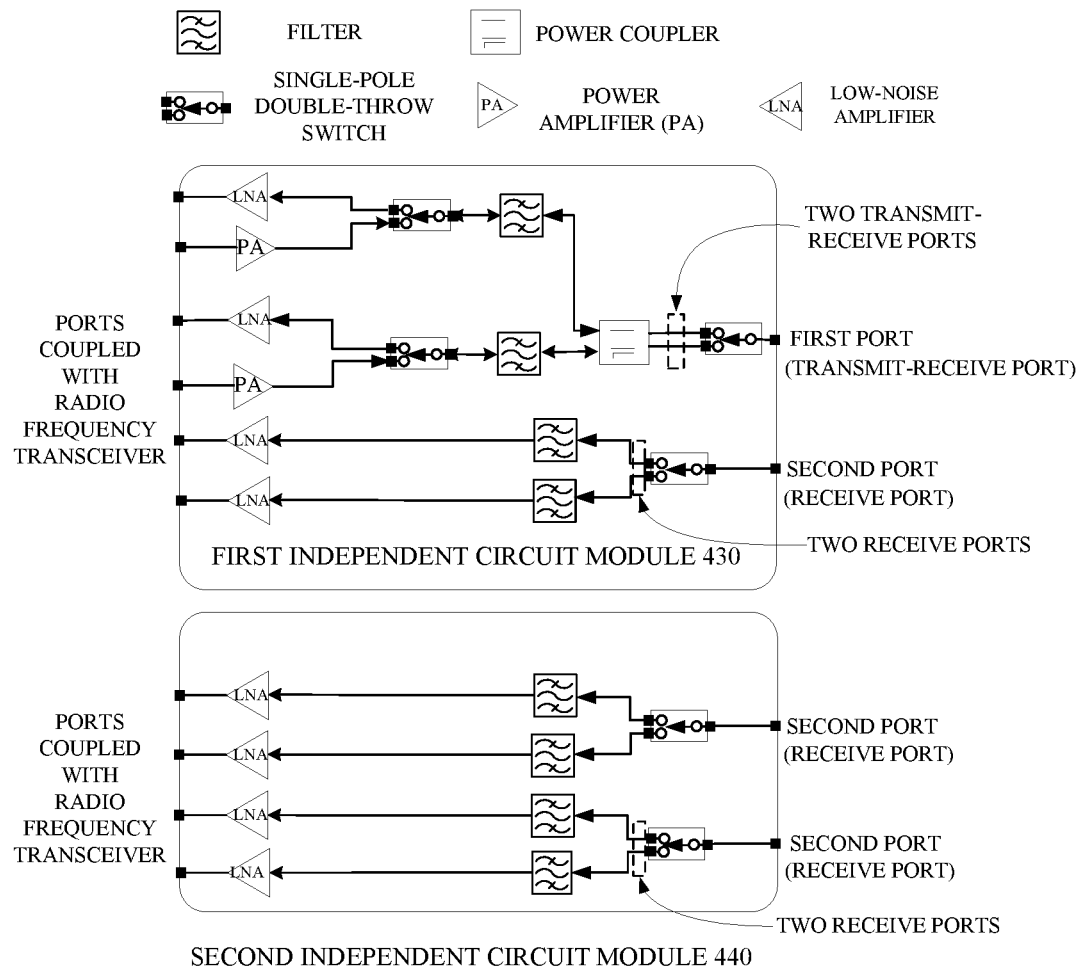
FIG. 4B is a schematic structural diagram illustrating another radio frequency circuit including two independent circuit modules according to an implementation of the present disclosure.

The radio frequency circuit including two independent circuit modules is illustrated in FIG. 4B. The first independent circuit module 430 and the second independent circuit module 440 have the same number of processing circuits and ports.

In this implementation, the radio frequency circuit physically includes two independent circuit modules, and the two independent circuit modules have the same number of processing circuits and ports, which is beneficial to reducing the volume of each circuit module and the number of switches of each circuit module.

In one possible implementation, the two independent circuit modules are embodied as one first independent circuit module 450 and one second independent circuit module 460. The first independent circuit module 450 includes one first port and multiple second ports, the first port is configured to be coupled with the first T port of the multiway switch, and each second port of the first independent circuit module 450 is configured to be coupled with a corresponding second T port of the multiway switch (that is, one of the three second T ports of the multiway switch). The second independent circuit module 460 includes one second port, and the second port of the second independent circuit module 460 is configured to be coupled with a corresponding second T port of the multiway switch (that is, one of the three second T ports of the multiway switch).

The first independent circuit module 450 includes one transceiver integrated circuit and two receiver integrated circuits. The transceiver integrated circuit includes two transceiver circuits, and the two transceiver circuits have two transmit-receive ports coupled with the first port of the first independent circuit module 450. Each of the two transceiver circuits includes one receiver circuit and one transmitter circuit. Each of the two receiver integrated circuits of the first independent circuit module 450 includes two receiver circuits, and the two receiver circuits have two receive ports coupled with one of the second ports of the first independent circuit module 450.

The second independent circuit module 460 includes one receiver integrated circuit. The receiver integrated circuit of the second independent circuit module 460 includes two receiver circuits, and the two receiver circuits have two receive ports coupled with the second port of the second independent circuit module 460.

Figure 4C:
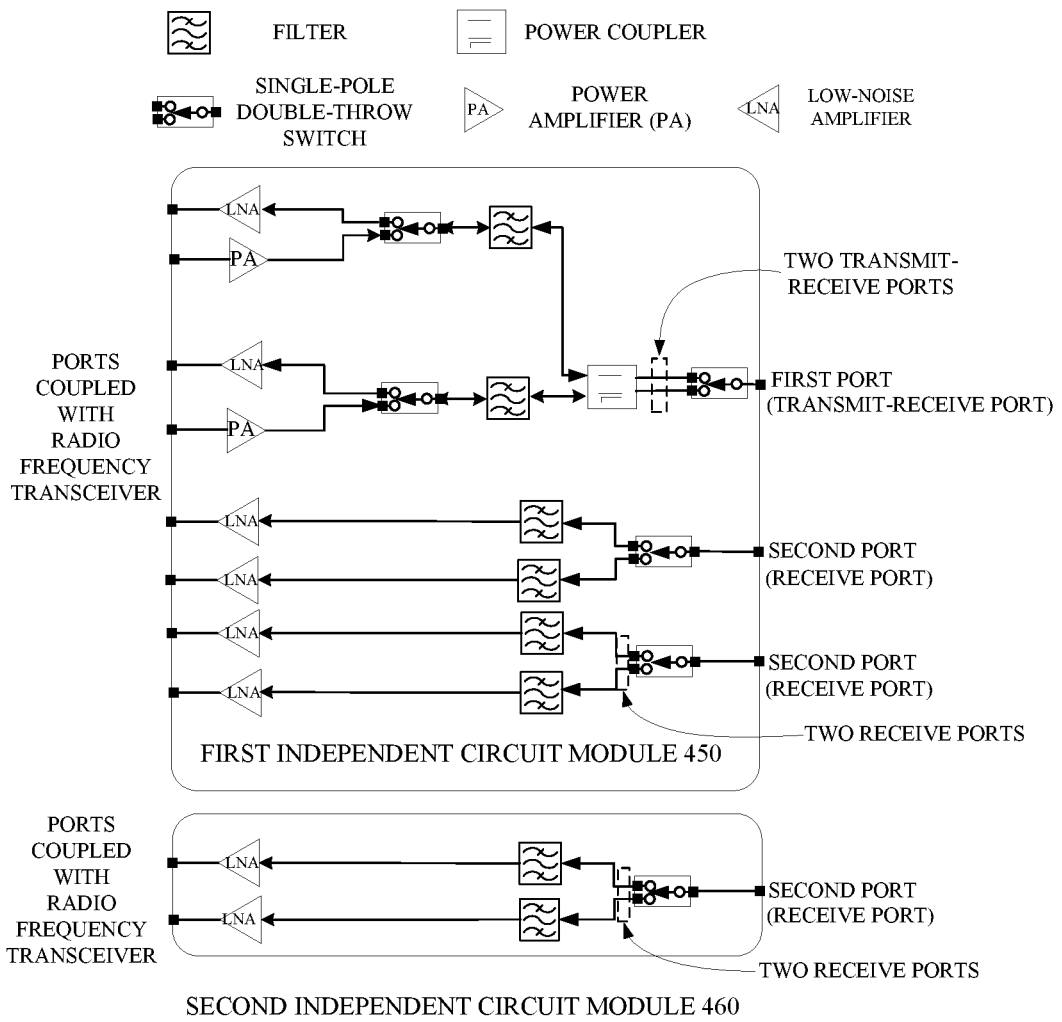
FIG. 4C is a schematic structural diagram illustrating still another radio frequency circuit including two independent circuit modules according to an implementation of the present disclosure.

The radio frequency circuit including two independent circuit modules is illustrated in FIG. 4C. The second independent circuit module 460 only includes one receiver integrated circuit, and the first independent circuit module 450 includes other circuits except one receiver integrated circuit.

In this implementation, the radio frequency circuit physically includes two independent circuit modules, and one of the two independent circuit modules is only provided with one receiver integrated circuit, which is beneficial to improving the reusability of independent circuit modules, and to improving the convenience and flexibility of radio frequency circuit configuration.

In some possible implementations, the radio frequency circuit of the electronic device logically includes two transmitter circuits and eight receiver circuits. The radio frequency circuit physically includes three independent circuit modules. The three independent circuit modules have one transmit-receive port and multiple receive ports. The transmit-receive port is configured to be coupled with the first T port. Each receive port is configured to be coupled with a corresponding second T port, that is, the multiple receive ports are configured to be coupled with multiple second T ports in one-to-one correspondence.

In this implementation, the radio frequency circuit physically includes three independent circuit modules, and the volume of each independent circuit module is further reduced. Moreover, fewer processing circuits of each independent circuit module will result in a higher reusability of each independent circuit module. Also, it is possible to enhance the adaptability of the installation of each independent circuit module.

In one possible implementation, the three independent circuit modules are embodied as one first independent circuit module 510, one second independent circuit module 520, and one third independent circuit module 530. The first independent circuit module 510 includes one first port configured to be coupled with the first T port of the multiway switch. The second independent circuit module 520 includes multiple second ports and the third independent circuit module 530 includes one second port, and each second port is configured to be coupled with a corresponding second T port of the multiway switch (that is, one of the three second T ports of the multiway switch).

The first independent circuit module 510 includes one transceiver integrated circuit. The transceiver integrated circuit includes two transceiver circuits, and the two transceiver circuits have two transmit-receive ports coupled with the first port of the first independent circuit module 510. Each of the two transceiver circuits includes one receiver circuit and one transmitter circuit.

The second independent circuit module 520 includes two receiver integrated circuits. Each of the two receiver integrated circuits of the second independent circuit module 520 includes two receiver circuits, and the two receiver circuits have two receive ports coupled with one of the second ports of the second independent circuit module 520.

The third independent circuit module 530 includes one receiver integrated circuit. The receiver integrated circuit of the third independent circuit module 530 includes two receiver circuits, and the two receiver circuits have two receive ports coupled with the second port of the third independent circuit module 530.

Figure 5A:
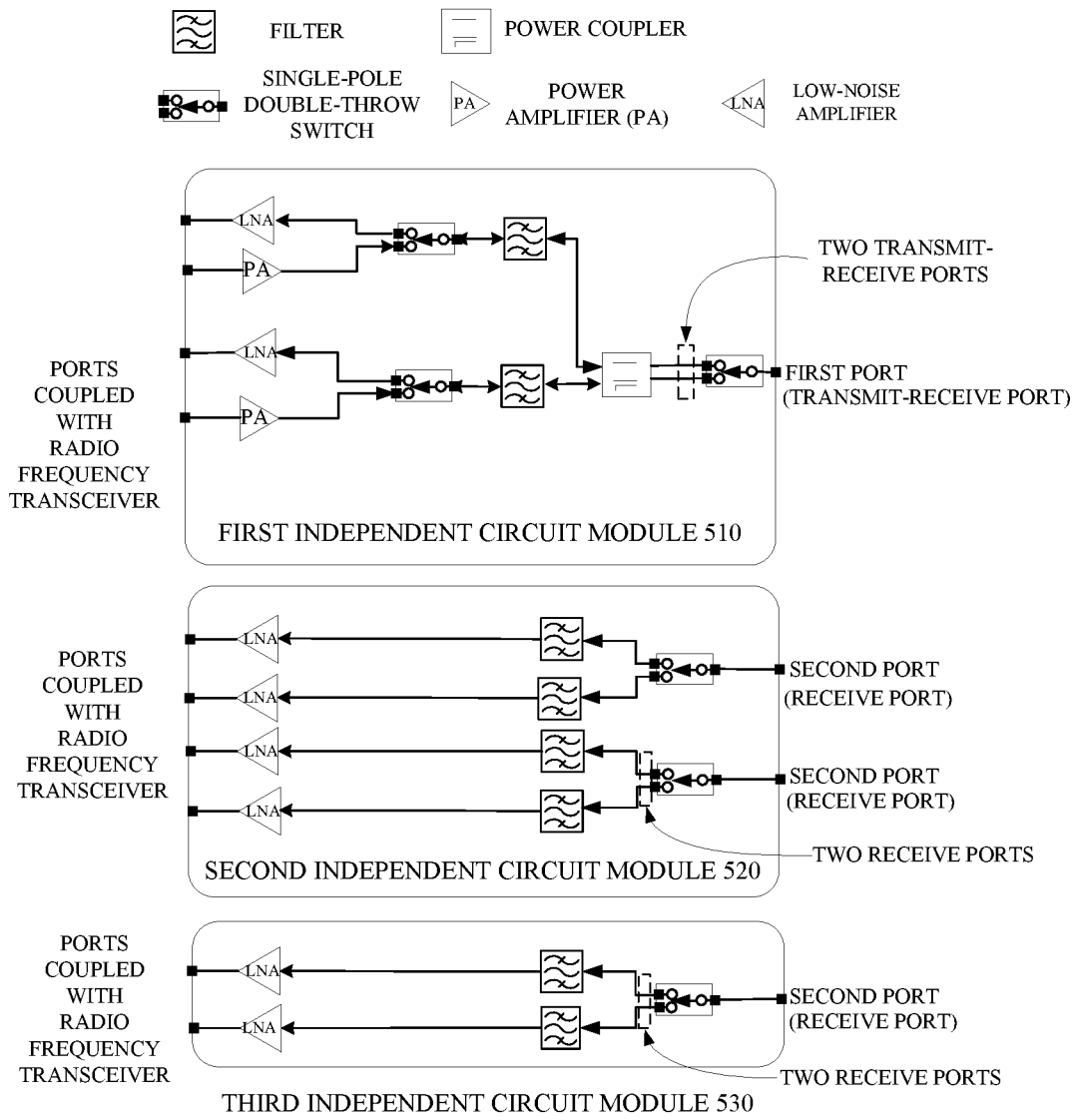
FIG. 5A is a schematic structural diagram illustrating a radio frequency circuit including three independent circuit modules according to an implementation of the present disclosure.

The radio frequency circuit including three independent circuit modules is illustrated in FIG. 5A. The first independent circuit module 510, the second independent circuit module 520, and the third independent circuit module 530 are different from each other and are composed of different processing circuits.

In this implementation, the radio frequency circuit physically includes three independent circuit modules, and each of the three independent circuit modules has a different configuration, which is beneficial to improving the reusability of each independent circuit module and to improving the diversity of each independent circuit module.

In one possible implementation, the three independent circuit modules are embodied as one first independent circuit module 540, one second independent circuit module 550, and one third independent circuit module 560. The first independent circuit module 540 includes one first port and one second port, the first port is configured to be coupled with the first T port of the multiway switch, and the second port of the first independent circuit module 540 is configured to be coupled with a corresponding second T port of the multiway switch (that is, one of the three second T ports of the multiway switch). The second independent circuit module 550 and the third independent circuit module 560 each include one second port, and each second port is configured to be coupled with a corresponding second T port of the multiway switch (that is, one of the three second T ports of the multiway switch).

The first independent circuit module 540 includes one transceiver integrated circuit and one receiver integrated circuit. The transceiver integrated circuit includes two transceiver circuits, and the two transceiver circuits have two transmit-receive ports coupled with the first port of the first independent circuit module 540. Each of the two transceiver circuits includes one receiver circuit and one transmitter circuit. The receiver integrated circuit of the first independent circuit module 540 includes two receiver circuits, and the two receiver circuits have two receive ports coupled with the second port of the first independent circuit module 540.

The second independent circuit module 550 includes one receiver integrated circuit. The receiver integrated circuit of the second independent circuit module 550 includes two receiver circuits, and the two receiver circuits have two receive ports coupled with the second port of the second independent circuit module 550.

The third independent circuit module 560 includes one receiver integrated circuit. The receiver integrated circuit of the third independent circuit module 560 includes two receiver circuits, and the two receiver circuits have two receive ports coupled with the second port of the third independent circuit module 560.

Figure 5B:
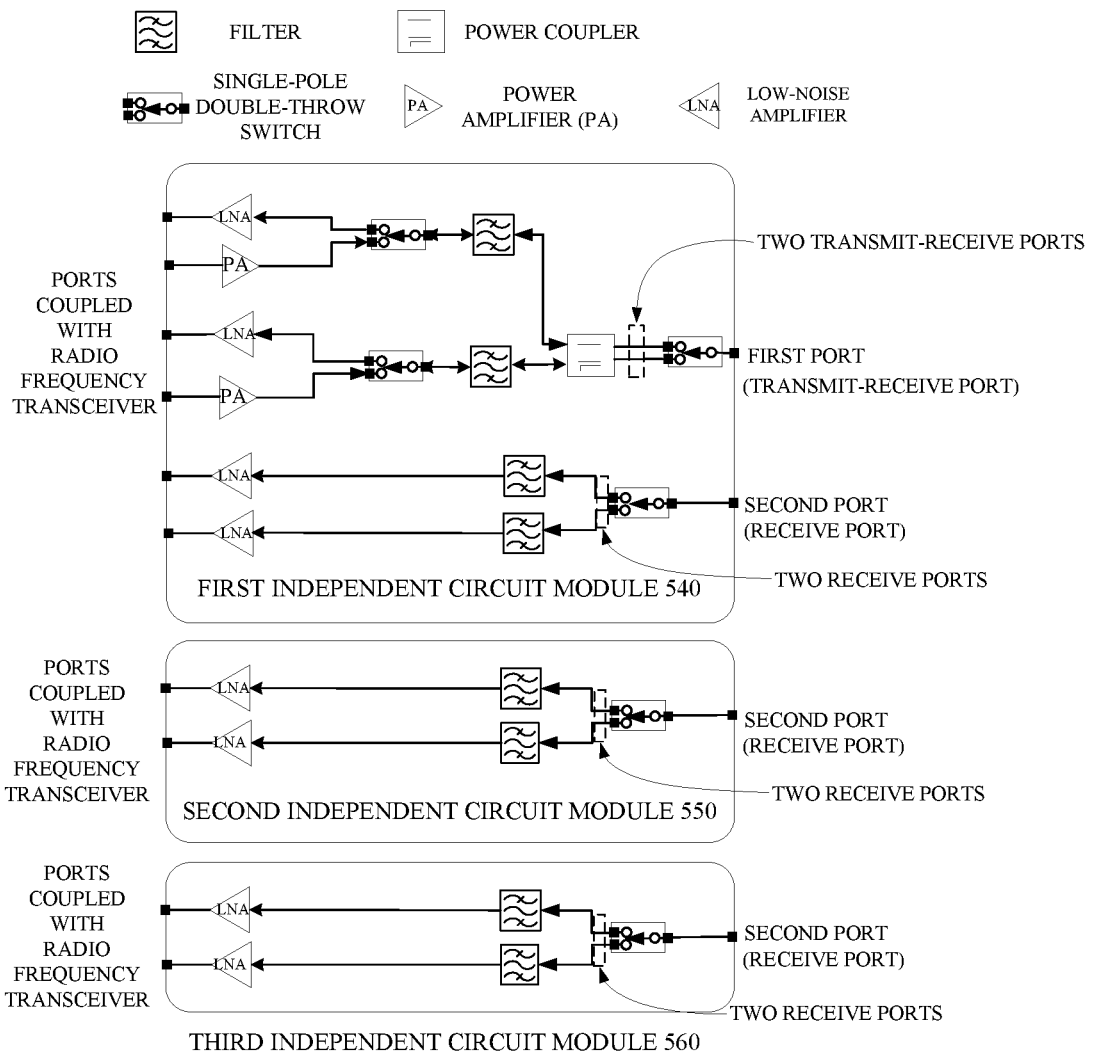
FIG. 5B is a schematic structural diagram illustrating another radio frequency circuit including three independent circuit modules according to an implementation of the present disclosure.

The radio frequency circuit including three independent circuit modules is illustrated in FIG. 5B. The three independent circuit modules include one first independent circuit module 540, one second independent circuit module 550, and one third independent circuit module 560, where the second independent circuit module 550 and the third independent circuit module 560 have the same configuration.

In this implementation, the radio frequency circuit physically includes three independent circuit modules, and the configurations of two independent circuit modules among the three independent circuit modules are the same, which is beneficial to improving the convenience of the production of the radio frequency circuit and the plasticity of the installation of the radio frequency circuit, while reducing the volume of each independent circuit module.

In one possible implementation, the radio frequency circuit of the electronic device logically includes two transmitter circuits and eight receiver circuits. The radio frequency circuit physically includes four independent circuit modules. The four independent circuit modules have one transmit-receive port and multiple receive ports. The transmit-receive port is configured to be coupled with the first T port. Each receive port is configured to be coupled with a corresponding second T port, that is, the multiple receive ports are configured to be coupled with multiple second T ports in one-to-one correspondence.

In this implementation, the radio frequency circuit is divided into four independent circuit modules and each independent circuit module can have a volume as small as possible, which is beneficial to improving the diversity of the radio frequency circuit including the four independent circuit modules, and to applying the radio frequency circuit to various electronic devices.

In one possible implementation, the four independent circuit modules are embodied as one first independent circuit module 610, one second independent circuit module 620, one third independent circuit module 630, and one fourth independent circuit module 640. The first independent circuit module 610 includes one first port configured to be coupled with the first T port of the multiway switch. The second independent circuit module 620, the third independent circuit module 630, and the fourth independent circuit module 640 each include one second port, and each second port is configured to be coupled with a corresponding second T port of the multiway switch (that is, one of the three second T ports of the multiway switch).

The first independent circuit module 610 includes one transceiver integrated circuit. The transceiver integrated circuit includes two transceiver circuits, and the two transceiver circuits have two transmit-receive ports coupled with the first port of the first independent circuit module 610. Each of the two transceiver circuits includes one receiver circuit and one transmitter circuit.

The second independent circuit module 620 includes one receiver integrated circuit. The receiver integrated circuit of the second independent circuit module 620 includes two receiver circuits, and the two receiver circuits have two receive ports coupled with the second port of the second independent circuit module 620.

The third independent circuit module 630 includes one receiver integrated circuit. The receiver integrated circuit of the third independent circuit module 630 includes two receiver circuits, and the two receiver circuits have two receive ports coupled with the second port of the third independent circuit module 630.

The fourth independent circuit module 640 includes one receiver integrated circuit. The receiver integrated circuit of the fourth independent circuit module 640 includes two receiver circuits, and the two receiver circuits have two receive ports coupled with the second port of the fourth independent circuit module 640.

Figure 6:
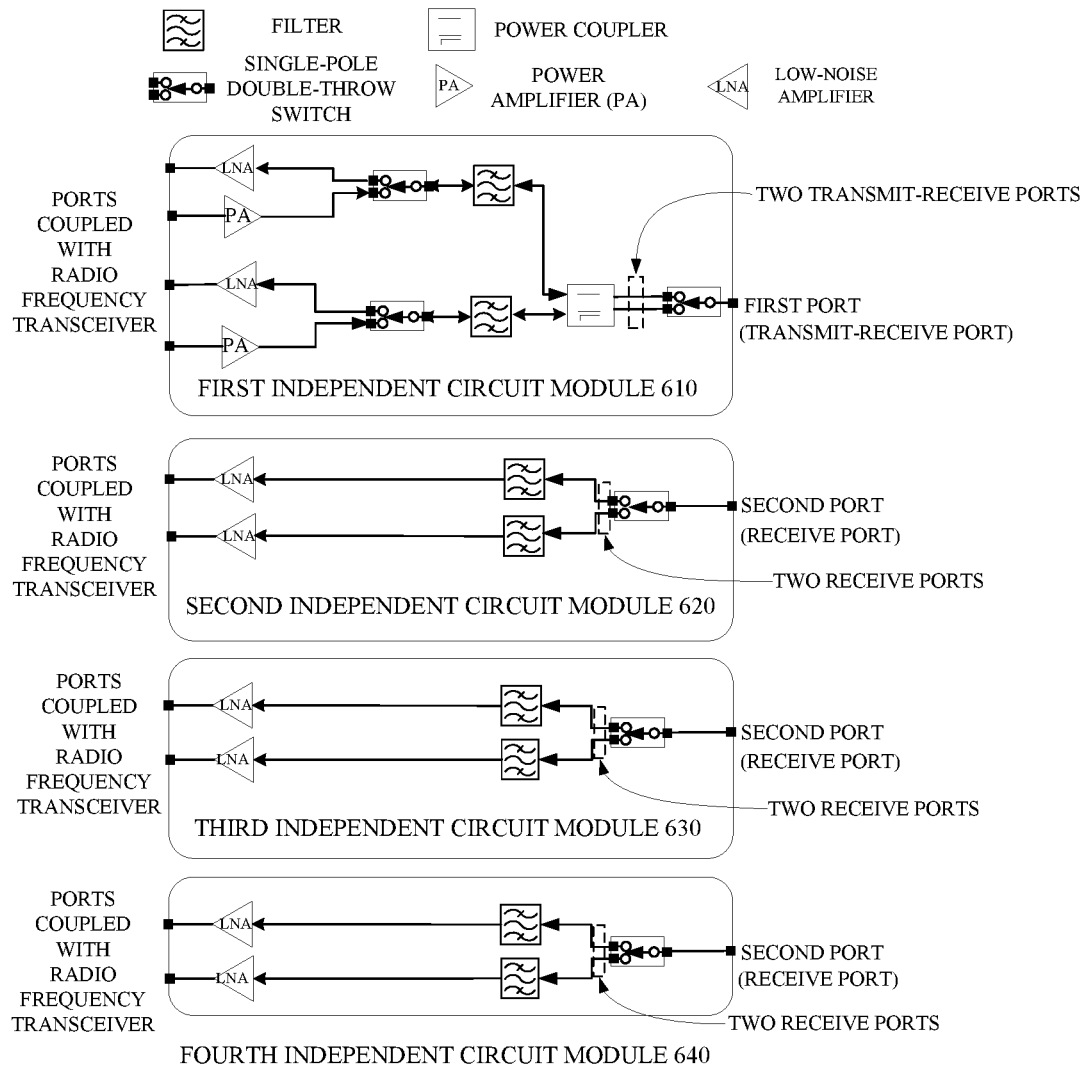
FIG. 6 is a schematic structural diagram illustrating a radio frequency circuit including four independent circuit modules according to an implementation of the present disclosure.

The radio frequency circuit including four independent circuit modules is illustrated in FIG. 6. The four independent circuit modules include one first independent circuit module

610, one second independent circuit module 620, one third independent circuit module 630, and one fourth independent circuit module 640, where the second independent circuit module 620, the third independent circuit module 630, and the fourth independent circuit module 640 have the same configuration.

In this implementation, the radio frequency circuit physically includes four independent circuit modules, and three of the four independent circuit modules have the same configuration, thus, in fact, only two types of independent circuit modules are adopted in making the radio frequency circuit. Moreover, a minimum number of processing circuits are included in each independent circuit module, which further improves the simplicity and convenience of the radio frequency circuit making.

Figure 7:
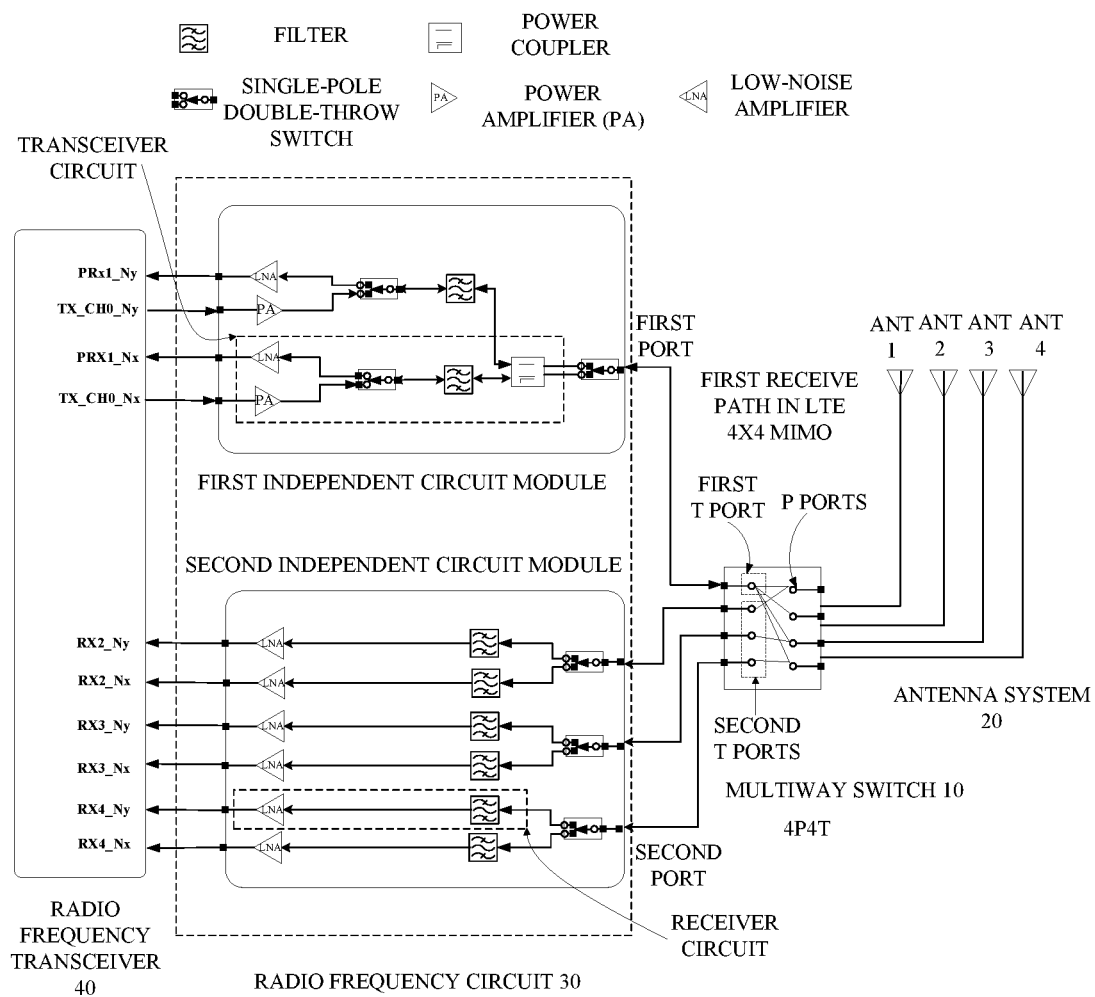
FIG. 7 is a schematic structural diagram illustrating an overall architecture of a radio frequency system of an electronic device according to an implementation of the present disclosure.

For example, the overall architecture of the radio frequency system of an electronic device is illustrated in FIG. 7. When the electronic device transmits data through a frequency band Nx, the working process of the radio frequency system is as follows. A radio frequency transceiver 40 sends, through a transmit port TX_CH0_Nx at the frequency band Nx, a transmit signal to a PA of a first independent circuit module coupled with the transmit port TX_CH0_Nx. The PA sends the transmit signal received to a first port of the first independent circuit module through a filter and a power coupler of a transceiver circuit. Due to the fact that a first T port of the multiway switch 10 with which the first port is coupled is a full coupled port supporting a signal transmission function, the first port can send four transmit signals to four P ports through the first T port of the multiway switch 10 in the same time period. In this situation, the four P ports transmit the four transmit signals through antennas corresponding to each P port, to transmit four channels of data to external devices simultaneously.

Similarly, when the electronic device receives data through a frequency band Ny, the working process of the radio frequency system is as follows. The four antennas send four receive signals respectively to the four P ports of the multiway switch 10 in the same time period. The four P ports send the four receive signals respectively to four T ports of the multiway switch 10 (that is, the four T ports can include one first T port supporting a transmission-reception function and three second T ports supporting a reception function). Each of the four T ports receives one receive signal from each of the four P ports. Each of the four T ports sends, through a first port of a first independent circuit module or a second port of a second independent circuit module, the receive signal to one of four receiver circuits, where each receiver circuit corresponds to a receive port of a frequency band Ny of the radio frequency transceiver 40. Each receiver circuit sends the receive signal received to the receive port of the frequency band Ny of the radio frequency transceiver (that is, the receive ports of the frequency band Ny are PRx1_Ny, RX2_Ny, RX3_Ny, RX4_Ny respectively) through an LNA and a filter, thereby implementing four receive-signal paths of the electronic device.

It may be understood that circuits of an independent circuit module may be diverse and will not be uniquely limited to the implementations of the present disclosure. The following provides some possible implementations.

In one possible implementation, the receiver integrated circuit includes two receiver circuits operable at different frequency bands and integrated through a switch of the receiver integrated circuit. The switch of the receiver integrated circuit has an input port and two output ports, the input port of the switch of the receiver integrated circuit is coupled with a corresponding second port of an independent circuit module, and each of the two output ports of the switch of the receiver integrated circuit is coupled with one of two first filters of the two receiver circuits.

In one possible implementation, the transceiver circuit includes one receiver circuit and one transmitter circuit operable at same frequency band and integrated through a switch of the transceiver circuit. The receiver circuit of the transceiver circuit includes an LNA having an input port coupled with the switch of the transceiver circuit, the transmitter circuit of the transceiver circuit includes a PA having an output port coupled with the switch of the transceiver circuit, the switch of the transceiver circuit is coupled with a second filter, the second filter is coupled with a power coupler, and the power coupler is coupled with the first port of an independent circuit module.

In one possible implementation, the transceiver integrated circuit includes two transceiver circuits operable at different frequency bands and sharing an input port of the power coupler, and the power coupler has an output port coupled with the first port of an independent circuit module through a switch of the transceiver integrated circuit.

In one possible implementation, a receiver circuit includes an LNA and a first filter. The first filter has an input port coupled with a second port of an independent circuit module, the first filter has an output port coupled with an input port of the LNA, and the LNA has an output port coupled with a corresponding port of a radio frequency (RF) transceiver.

In one possible implementation, a transmitter circuit includes a PA, a third filter, and a power coupler. The PA has an input port coupled with a corresponding port of the RF transceiver, the PA has an output port coupled with an input port of the third filter, the third filter has an output port coupled with an input port of the power coupler, and the power coupler has an output port coupled with the first port of an independent circuit module.

Figure 8:
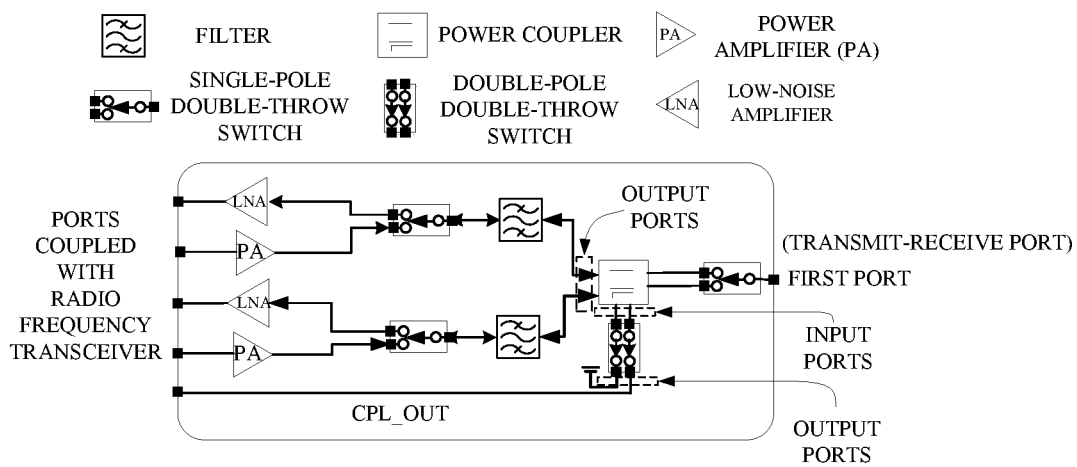
FIG. 8 is a schematic structural diagram illustrating a transceiver integrated circuit of a radio frequency circuit according to an implementation of the present disclosure.

The transmitter circuit may further include multiple control circuits. For example, as illustrated in FIG. 8, an independent circuit module including one transceiver integrated circuit is provided. The transceiver integrated circuit can further include a double-pole double-throw (DPDT) switch. Filters of the transceiver integrated circuit have output ports coupled with input ports of the DPDT switch. The DPDT switch has output ports, one end of the output ports of the DPDT switch is grounded and the other end of the output ports of the DPDT switch is coupled with a coupling output port CPL_OUT, to detect output power of PAs.

In this implementation, although the physical form of the radio frequency circuit is various, it is composed of these five types of processing circuits. Moreover, the structure of the five types of processing circuits is simple, and fewer circuit components are required, which is advantageous for simplifying the radio frequency circuit.

In one possible implementation, the multiway switch is composed of field-effect transistors (FETs), and the multiway switch includes twenty-nine FETs.

Figure 9:
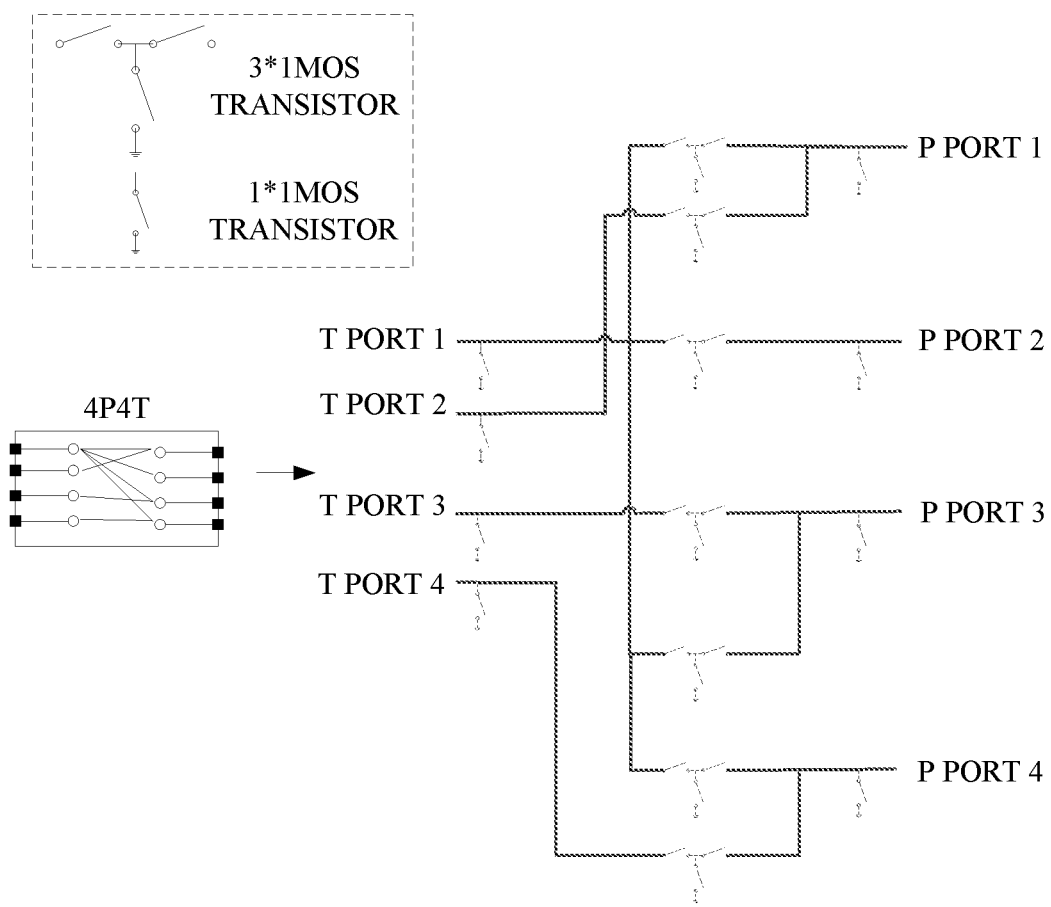
FIG. 9 is a schematic structural diagram illustrating a multiway switch according to an implementation of the present disclosure.

One first T port among the four T ports is a full-coupling port. As illustrated in FIG. 9, the number of FETs of a multiway switch is $4+(1*4+(4-1)*1)*3+4=29$.

It can be seen that, by limiting the number of T ports that are fully coupled with four P ports among the four T ports to one, the number of switches of the radio frequency system of the electronic device can be effectively reduced. That is to say, the number of full-coupling T ports has a great influence on the performance of the radio frequency system.

It can be understood that the specific implementation manners of the above-mentioned receiver circuit and the transmitter circuit may be various, and the implementation of the present disclosure is not limited. The matching form of the above radio frequency circuit and the multiway switch includes but is not limited to the structure of the drawing, and is merely an example herein.

In one possible implementation, the four antennas include a first antenna, a second antenna, a third antenna, and a fourth antenna. These four antennas are all operable at a fifth generation new radio (5G NR) frequency band.

The 5G NR band may include, for example, 3.3 GHz to 3.8 GHz and 4.4 GHz to 5 GHz.

In one possible implementation, the four antennas include a first antenna, a second antenna, a third antenna, and a fourth antenna. The first antenna and the fourth antenna are antennas operable at a long term evolution (LTE) frequency band and a 5G NR frequency band. The second antenna and the third antenna are antennas only operable at the 5G NR frequency band.

The first and fourth antennas are configured to support DL 4×4 MIMO of some frequency bands in LTE on terminals. These two receive antennas are shared with the 5G NR antenna (hereinafter, "shared antennas" for short). The LTE frequency band may include, for example, 1880-1920 MHz and 2496-2690 MHz.

Figure 10:
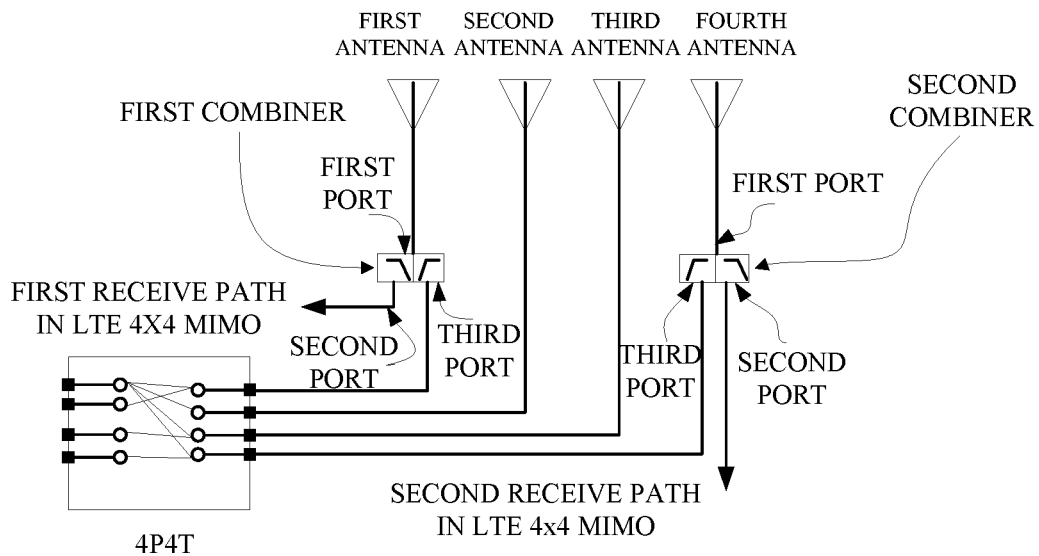
FIG. 10 is a schematic structural diagram illustrating an antenna system of an electronic device according to an implementation of the present disclosure.

In one possible implementation, as illustrated in FIG. 10, the antenna system further includes a first combiner and a second combiner. The first combiner has a first port coupled with the first antenna, a second port coupled with a first receive path in long term evolution 4×4 multiple-input multiple-output (LTE 4×4 MIMO) configuration of the electronic device, and a third port coupled with a corresponding P port of the four P ports of the multiway switch. The second combiner has a first port coupled with the fourth antenna, a second port coupled with a second receive path in LTE 4×4 MIMO configuration of the electronic device, and a third port coupled with a corresponding P port of the four P ports of the multiway switch.

The LTE 4*4 MIMO is a downlink LTE receive circuit and can be defined as a third receive path. Since the LTE currently has two receive paths, in order to support LTE 4×4 MIMO, the third receive path and a fourth receive path are added.

According to performance of the four antennas, the electronic device will configure one antenna with better performance for the circuit for PRX (primary receiver), and the antenna will be in a standby state. Moreover, the first T port in the switch having both the transmission function and the reception function can be configured for TX (transmit) and PRX purpose, and thus the antenna can be switched arbitrarily. In this way, there is no need to restrict the coupling between ports of shared antennas.

Figure 11:
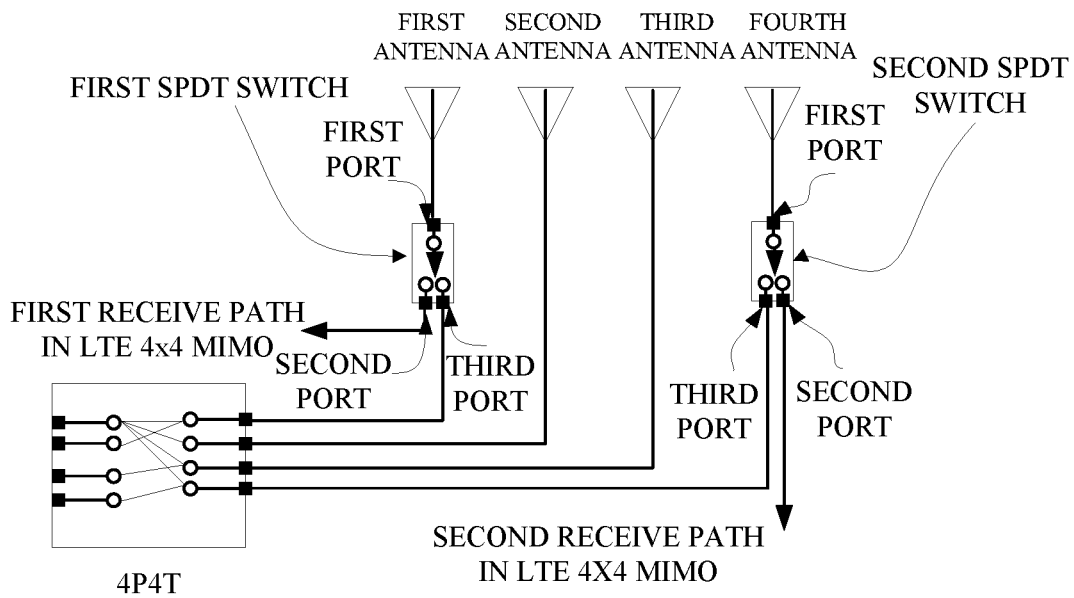
FIG. 11 is a schematic structural diagram illustrating another antenna system of an electronic device according to an implementation of the present disclosure.

In one possible implementation, as illustrated in FIG. 11, the antenna system further includes a first single-pole double-throw (SPDT) switch and a second SPDT switch. The first SPDT switch has a first port coupled with the first antenna, a second port coupled with a first receive path in LTE 4×4 MIMO configuration of the electronic device, and a third port coupled with a corresponding P port of the four P ports of the multiway switch. The second SPDT switch has a first port coupled with the fourth antenna, a second port coupled with a second receive path in LTE 4×4 MIMO configuration of the electronic device, and a third port coupled with a corresponding P port of the four P ports of the multiway switch.

It can be seen that, for the transmit paths and the receive paths of the radio frequency system of the electronic device, the transmit paths can include one single independent switch (a 4P4T switch) or two independent switches (a SPDT switch and a 4P4T switch), and the receive paths can include one single independent switch (a 4P4T switch) or two independent switches (a SPDT switch and a 4P4T switch). That is to say, by integrating more switch functions of the transmit paths and the receive paths of the radio frequency system into the 4P4T switch, the number of independent switches of the transmit paths and the receive paths can be effectively reduced.

The schemes of the disclosure can be combined or replaced with each other. As an example, the radio frequency circuit described above can be applied or combined into the radio frequency system or the wireless communication device below. As another example, the antenna system and/or the multiway switch described above can be applied or combined into the radio frequency system and the wireless communication device below. It is to be noted that, "the antenna system and/or the multiway switch" of the disclosure means "the antenna system", "the multiway switch", or "the antenna system and the multiway switch".

Figure 12:
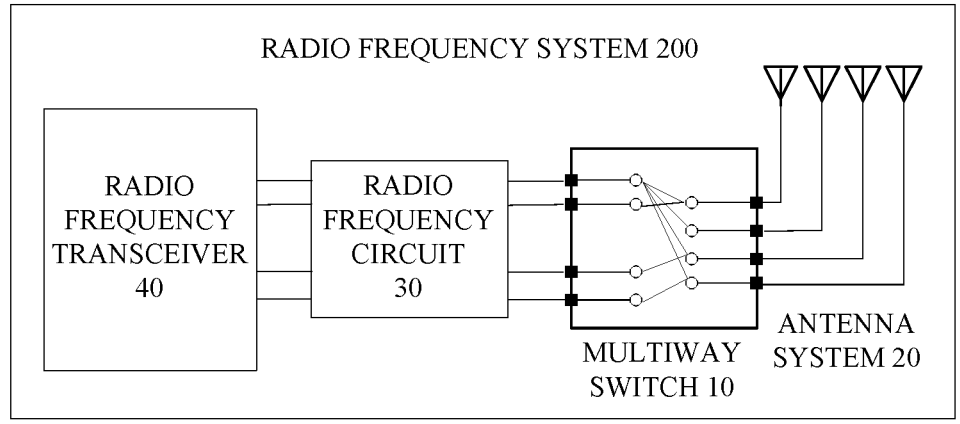
FIG. 12 is a schematic structural diagram illustrating a radio frequency system according to an implementation of the present disclosure.

FIG. 12 is a schematic structural diagram illustrating a radio frequency system 200 according to an implementation of the present disclosure. As illustrated in FIG. 12, the radio frequency system 200 includes an antenna system 20, a radio frequency transceiver 40, a radio frequency circuit 30 coupled with the radio frequency transceiver 40, and the multiway switch 10 according to any of the above implementations.

As an implementation, the multiway switch 10 includes four T ports and four P ports. The four T ports include one first T port at least supporting a transmission function and three second T ports supporting only a reception function. The first T port is coupled with all of the four P ports. The antenna system 20 includes four antennas corresponding to the four P ports. The multiway switch 10 is configured to enable a preset function of transmitting an SRS through the four antennas in turn.

As another implementation, the four antennas include a first antenna, a second antenna, a third antenna, and a fourth antenna. The first antenna and the fourth antenna are antennas operable at a long term evolution (LTE) frequency band and a fifth generation new radio (5G NR) frequency band. The second antenna and the third antenna are antennas only operable at the 5G NR frequency band.

As still another implementation, the antenna system 20 further includes a first combiner and a second combiner. The first combiner includes a first port coupled with the first antenna, a second port coupled with a first receive path in long term evolution 4×4 multiple-input multiple-output (LTE 4×4 MIMO) configuration of the radio frequency system 200, and a third port coupled with a corresponding P port of the four P ports of the multiway switch 10. The second combiner includes a first port coupled with the fourth antenna, a second port coupled with a second receive path in LTE 4×4 MIMO configuration of the radio frequency system 200, and a third port coupled with a corresponding P port of the four P ports of the multiway switch 10.

Figure 13:
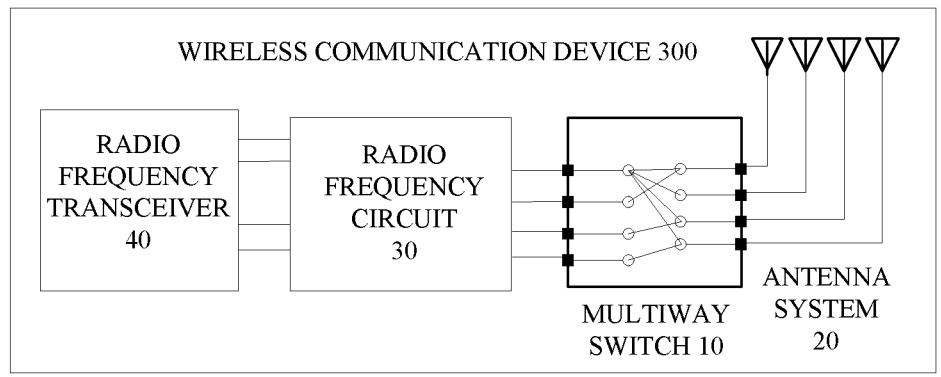
FIG. 13 is a schematic structural diagram illustrating a wireless communication device according to an implementation of the present disclosure.

FIG. 13 is a schematic structural diagram illustrating a wireless communication device 300 according to an implementation of the present disclosure. As illustrated in FIG. 13, the wireless communication device 300 (for example can be a terminal device, a network device, or the like) includes an antenna system 20, a radio frequency transceiver 40, a radio frequency circuit 30 coupled with the radio frequency transceiver 40, and the multiway switch 10 according to any of the above implementations.

As an implementation, the multiway switch 10 includes four T ports and four P ports. The four T ports include one first T port coupled with all of the four P ports. The antenna system 20 includes four antennas corresponding to the four P ports. The multiway switch 10 is configured to enable a preset function of transmitting an SRS through the four antennas in turn.

As another implementation, the four T ports further include three second T ports, each of the three second T ports is coupled with one of the four P ports, and any two second T ports operable at the same frequency band are coupled with different P ports of the four P ports. Each of the four P ports is coupled with a corresponding antenna of the four antennas. The first T port at least supports a transmission function. The three second T ports only support a reception function.

Figure 14:
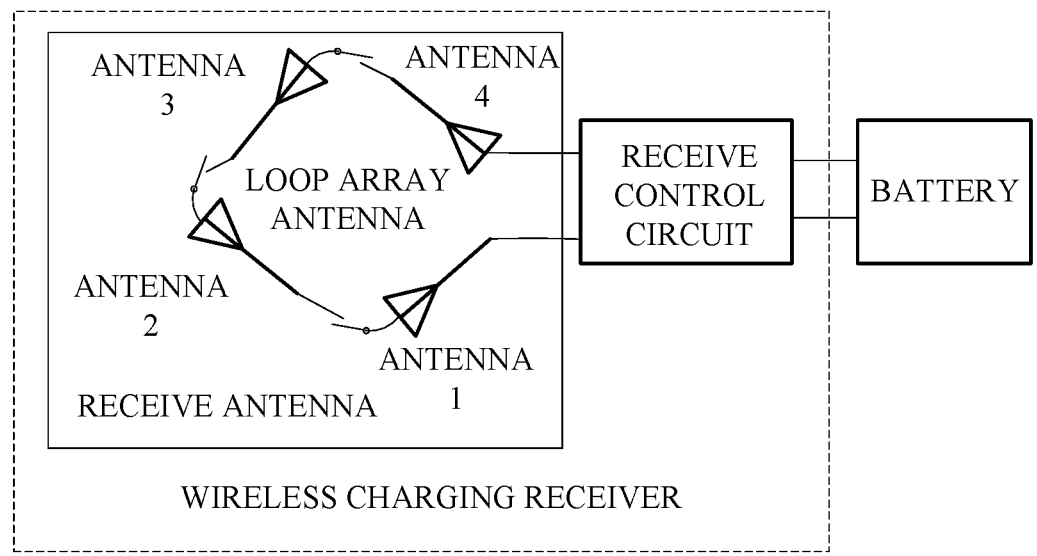
FIG. 14 is a schematic diagram illustrating a wireless charging receiver for multiplexing an antenna of a wireless communication device according to an implementation of the present disclosure.

In addition, as illustrated in FIG. 14, the four antennas of the antenna system described in the implementations of the disclosure can also be multiplexed by a wireless charging receiver of the electronic device. In an implementation, the wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to a battery for charging. The receive control circuit can dynamically adjust a frequency of the loop array antenna and enable the frequency of the loop array antenna to be matched with frequencies of the transmit antennas of the wireless charging transmitter, so as to achieve paired charging. Alternatively, the receive control circuit interacts with the wireless charging transmitter in real time on a frequency change range to implement an "exclusive encryption" wireless charging mode.

The receive antenna may be an antenna include at least one of four antennas (When the receive antenna is composed more than one antenna, the antenna is strobed via the switch between the antennas).

Figure 15:
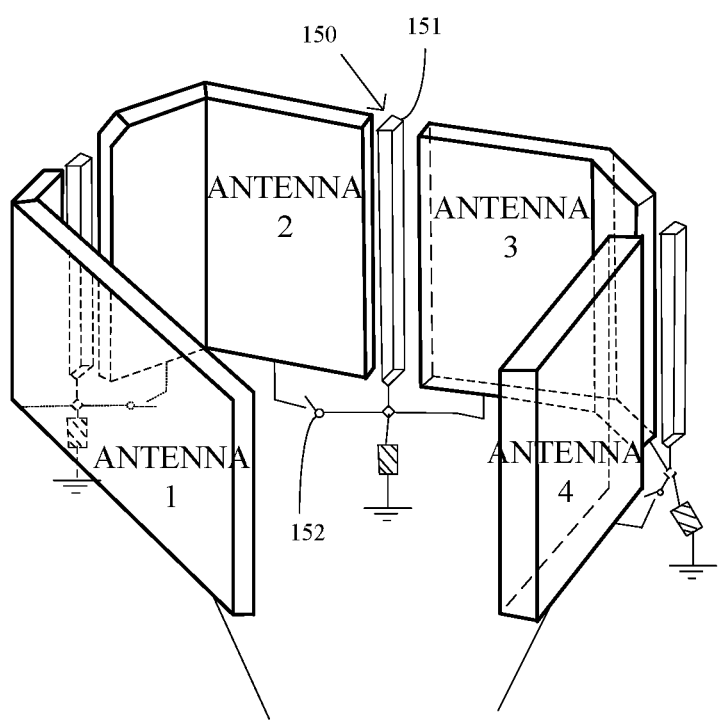
FIG. 15 is a schematic structural diagram illustrating a loop array antenna composed of four antennas according to an implementation of the present disclosure.

For example, as illustrated in FIG. 15, the receive antenna is the loop array antenna composed of four antennas. The four antennas include antenna 1, antenna 2, antenna 3, and antenna 4. Antenna 1 and antenna 4 are operable at both a LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 150 with an isolation function. The gate circuit 150 includes a spacer 151 and a switch 152, where the spacer 151 is a conductor and the switch 152 is further coupled with a controller. The electronic device can conduct the switch 152 of each gate circuit 150 in a wireless charging mode to form a loop array antenna for receiving energy. By adding the spacers 151 among the antennas, the gate circuit 150 can reduce mutual coupling among the multiple antennas of the electronic device in a normal communication mode, improve isolation among the multiple antennas, and optimize performance of the antennas. On the other hand, the multiple antennas can be coupled in series to form the loop array antenna through the switches 152, so as to better match the transmit antennas to transfer energy. Furthermore, since the capabilities of antenna 1 and antenna 4 are stronger than those of antenna 2 and antenna 3, the loop array antenna thus arranged can reduce energy loss in transmission as much as possible.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch, comprising:
   four throw (T) ports and four pole (P) ports, the four T ports comprising one first T port and three second T ports, the first T port being coupled with all of the four P ports, and each of the three second T ports being coupled with only one of the four P ports; and
   the multiway switch being configured to be coupled with a radio frequency circuit and an antenna system of an electronic device operable in a dual-frequency single-transmit mode to enable a preset function of the electronic device, the antenna system comprising four antennas corresponding to the four P ports, and the preset function being a function of transmitting a sounding reference signal (SRS) through the four antennas in turn.

2. The multiway switch of claim 1, wherein
   among the three second T ports, second T ports operable at the same frequency band are coupled with different P ports of the four P ports;
   each of the four P ports is coupled with a corresponding antenna of the four antennas;
   the first T port at least supports a transmission function; and
   the three second T ports only support a reception function.

3. A radio frequency system, comprising an antenna system, a radio frequency transceiver, a radio frequency circuit coupled with the radio frequency transceiver, and a multiway switch coupled with the radio frequency circuit and the antenna system;
   the multiway switch comprising four T ports and four P ports; the four T ports comprising one first T port at least supporting a transmission function and three second T ports supporting only a reception function, the first T port being coupled with all of the four P ports, and each of the three second T ports being coupled with only one of the four P ports;
   the antenna system comprising four antennas corresponding to the four P ports; and
   the multiway switch being configured to enable a preset function of transmitting an SRS through the four antennas in turn.

4. The radio frequency system of claim 3, wherein
   the radio frequency circuit physically comprises one independent circuit module; and
   the independent circuit module has one transmit-receive port and receive ports, the transmit-receive port is configured to be coupled with the first T port, and each receive port is configured to be coupled with a corresponding second T port.

5. The radio frequency system of claim 3, wherein
   the radio frequency circuit physically comprises two independent circuit modules; and
   the two independent circuit modules have one transmit-receive port and receive ports, the transmit-receive port is configured to be coupled with the first T port, and each receive port is configured to be coupled with a corresponding second T port.

6. The radio frequency system of claim 3, wherein
the radio frequency circuit physically comprises three independent circuit modules; and
the three independent circuit modules have one transmit-receive port and receive ports, the transmit-receive port is configured to be coupled with the first T port, each receive port is configured to be coupled with a corresponding second T port.

7. The radio frequency system of claim 3, wherein
the radio frequency circuit physically comprises four independent circuit modules; and
the four independent circuit modules have one transmit-receive port and receive ports, the transmit-receive port is configured to be coupled with the first T port, each receive port is configured to be coupled with a corresponding second T port.

8. The radio frequency system of claim 3, wherein the multiway switch comprises twenty-nine field-effect transistors (FETs).

9. The radio frequency system of claim 3, wherein
the four antennas comprise a first antenna, a second antenna, a third antenna, and a fourth antenna;
the first antenna and the fourth antenna are antennas operable at a long term evolution (LTE) frequency band and a fifth generation new radio (5G NR) frequency band; and
the second antenna and the third antenna are antennas only operable at the 5G NR frequency band.

10. The radio frequency system of claim 3, wherein the antenna system further comprises:
a first combiner, comprising:
a first port, coupled with the first antenna;
a second port, coupled with a first receive path in long term evolution 4×4 multiple-input multiple-output (LTE 4×4 MIMO) configuration of the radio frequency system; and
a third port, coupled with a corresponding P port of the four P ports of the multiway switch; and
a second combiner, comprising:
a first port, coupled with the fourth antenna;
a second port, coupled with a second receive path in LTE 4×4 MIMO configuration of the radio frequency system; and
a third port, coupled with a corresponding P port of the four P ports of the multiway switch.

11. The radio frequency system of claim 4, wherein the independent circuit module comprises one first port and second ports, the first port is configured to be coupled with the first T port of the multiway switch, and each second port is configured to be coupled with one of the three second T ports of the multiway switch; and
the independent circuit module comprises one transceiver integrated circuit and three receiver integrated circuits, wherein the transceiver integrated circuit comprises two transceiver circuits having transmit-receive ports coupled with the first port of the independent circuit module, wherein each of the two transceiver circuits comprises one receiver circuit and one transmitter circuit, wherein each of the three receiver integrated circuits comprises two receiver circuits having receive ports coupled with one of the second ports of the independent circuit module.

12. The radio frequency system of claim 5, wherein the two independent circuit modules comprise one first independent circuit module and one second independent circuit module; wherein the first independent circuit module comprises one first port configured to be coupled with the first T port of the multiway switch, and the second independent circuit module comprises second ports and each second port is configured to be coupled with one of the three second T ports of the multiway switch;
the first independent circuit module comprises one transceiver integrated circuit, and the transceiver integrated circuit comprises two transceiver circuits having transmit-receive ports coupled with the first port of the first independent circuit module; wherein each of the two transceiver circuits comprises one receiver circuit and one transmitter circuit; and
the second independent circuit module comprises three receiver integrated circuits, and each of the three receiver integrated circuits comprises two receiver circuits having receive ports coupled with one of the second ports of the second independent circuit module.

13. The radio frequency system of claim 5, wherein the two independent circuit modules comprise one first independent circuit module and one second independent circuit module, wherein the first independent circuit module comprises one first port and one second port, the first port is configured to be coupled with the first T port of the multiway switch, and the second port of the first independent circuit module is configured to be coupled with one of the three second T ports of the multiway switch, wherein the second independent circuit module comprises second ports, and each second port is configured to be coupled with one of the three second T ports of the multiway switch;
the first independent circuit module comprises one transceiver integrated circuit and one receiver integrated circuit, wherein the transceiver integrated circuit comprises two transceiver circuits having transmit-receive ports coupled with the first port of the first independent circuit module, wherein each of the two transceiver circuits comprises one receiver circuit and one transmitter circuit, wherein the receiver integrated circuit of the first independent circuit module comprises two receiver circuits having receive ports coupled with the second port of the first independent circuit module; and
the second independent circuit module comprises two receiver integrated circuits, wherein each receiver integrated circuit of the second independent circuit module comprises two receiver circuits having receive ports coupled with one of the second ports of the second independent circuit module.

14. The radio frequency system of claim 5, wherein the two independent circuit modules comprise one first independent circuit module and one second independent circuit module, wherein the first independent circuit module comprises one first port and second ports, the first port is configured to be coupled with the first T port of the multiway switch, and each second port of the first independent circuit module is configured to be coupled with one of the three second T ports of the multiway switch, wherein the second independent circuit module comprises one second port, and the second port is configured to be coupled with one of the three second T ports of the multiway switch;
the first independent circuit module comprises one transceiver integrated circuit and two receiver integrated circuits, wherein the transceiver integrated circuit comprises two transceiver circuits having transmit-receive ports coupled with the first port of the first independent circuit module, wherein each of the two transceiver circuits comprises one receiver circuit and one transmitter circuit, wherein each receiver integrated circuit of the first independent circuit module comprises two receiver circuits having receive ports coupled with one of the second ports of the first independent circuit module; and the second independent circuit module comprises one receiver integrated circuit, wherein the receiver integrated circuit of the second independent circuit module comprises two receiver circuits having receive ports coupled with the second port of the second independent circuit module.

15. The radio frequency system of claim 6, wherein the three independent circuit modules comprise one first independent circuit module, one second independent circuit module, and one third independent circuit module, wherein the first independent circuit module comprises one first port configured to be coupled with the first T port of the multiway switch, wherein the second independent circuit module comprises second ports and the third independent circuit module comprises one second port, and each second port is configured to be coupled with one of the three second T ports of the multiway switch;

the first independent circuit module comprises one transceiver integrated circuit, wherein the transceiver integrated circuit comprises two transceiver circuits having transmit-receive ports coupled with the first port of the first independent circuit module, wherein each of the two transceiver circuits comprises one receiver circuit and one transmitter circuit, the second independent circuit module comprises two receiver integrated circuits, wherein each receiver integrated circuit of the second independent circuit module comprises two receiver circuits having receive ports coupled with one of the second ports of the second independent circuit module; and the third independent circuit module comprises one receiver integrated circuit, wherein the receiver integrated circuit of the third independent circuit module comprises two receiver circuits having receive ports coupled with the second port of the third independent circuit module.

16. The radio frequency system of claim 6, wherein the three independent circuit modules comprise one first independent circuit module, one second independent circuit module, and one third independent circuit module, wherein the first independent circuit module comprises one first port and one second port, the first port is configured to be coupled with the first T port of the multiway switch, and the second port of the first independent circuit module is configured to be coupled with one of the three second T ports of the multiway switch, wherein the second independent circuit module and the third independent circuit module each comprise one second port, and each second port is configured to be coupled with one of the three second T ports of the multiway switch;

the first independent circuit module comprises one transceiver integrated circuit and one receiver integrated circuit, wherein the transceiver integrated circuit comprises two transceiver circuits having transmit-receive ports coupled with the first port of the first independent circuit module, wherein each of the two transceiver circuits comprises one receiver circuit and one transmitter circuit, wherein the receiver integrated circuit of the first independent circuit module comprises two receiver circuits having receive ports coupled with the second port of the first independent circuit module;

the second independent circuit module comprises one receiver integrated circuit, wherein the receiver integrated circuit of the second independent circuit module comprises two receiver circuits having receive ports coupled with the second port of the second independent circuit module; and the third independent circuit module comprises one receiver integrated circuit, wherein the receiver integrated circuit of the third independent circuit module comprises two receiver circuits having receive ports coupled with the second port of the third independent circuit module.

17. The radio frequency system of claim 7, wherein the four independent circuit modules comprise one first independent circuit module, one second independent circuit module, one third independent circuit module, and one fourth independent circuit module; wherein the first independent circuit module comprises one first port configured to be coupled with the first T port of the multiway switch; wherein the second independent circuit module, the third independent circuit module, and the fourth independent circuit module each comprise one second port, and each second port is configured to be coupled with one of the three second T ports of the multiway switch;

the first independent circuit module comprises one transceiver integrated circuit, and the transceiver integrated circuit comprises two transceiver circuits having transmit-receive ports coupled with the first port of the first independent circuit module; wherein each of the two transceiver circuits comprises one receiver circuit and one transmitter circuit;

the second independent circuit module comprises one receiver integrated circuit, and the receiver integrated circuit of the second independent circuit module comprises two receiver circuits having receive ports coupled with the second port of the second independent circuit module;

the third independent circuit module comprises one receiver integrated circuit, and the receiver integrated circuit of the third independent circuit module comprises two receiver circuits having receive ports coupled with the second port of the third independent circuit module; and the fourth independent circuit module comprises one receiver integrated circuit, and the receiver integrated circuit of the fourth independent circuit module comprises two receiver circuits having receive ports coupled with the second port of the fourth independent circuit module.

18. The radio frequency system of claim 11, wherein the receiver integrated circuit comprises two receiver circuits operable at different frequency bands and integrated through a switch of the receiver integrated circuit, the switch of the receiver integrated circuit has an input port and two output ports, the input port of the switch of the receiver integrated circuit is coupled with a corresponding second port of the independent circuit module, and each of the two output ports of the switch of the receiver integrated circuit is coupled with one of two first filters of the two receiver circuits;

the transceiver circuit comprises one receiver circuit and one transmitter circuit operable at the same frequency band and integrated through a switch of the transceiver circuit, the receiver circuit of the transceiver circuit comprises a low-noise amplifier (LNA) having an input port coupled with the switch of the transceiver circuit, the transmitter circuit of the transceiver circuit comprises a power amplifier (PA) having an output port coupled with the switch of the transceiver circuit, the switch of the transceiver circuit is coupled with a second filter, the second filter is coupled with a power coupler, and the power coupler is coupled with the first port of the independent circuit module; and the transceiver integrated circuit comprises two transceiver circuits operable at different frequency bands and sharing an input port of the power coupler, and the power coupler has an output port coupled with the first port of the independent circuit module through a switch of the transceiver integrated circuit.

19. A wireless communication device, comprising a radio frequency transceiver, a radio frequency circuit coupled with the radio frequency transceiver, an antenna system, and a multiway switch coupled with the radio frequency circuit and the antenna system;

the multiway switch comprising four T ports and four P ports; the four T ports comprising one first T port and three second T ports, the first T port being coupled with all of the four P ports, and each of the three second T ports being coupled with only one of the four P ports;

the antenna system comprising four antennas corresponding to the four P ports; and the multiway switch being configured to enable a preset function of transmitting an SRS through the four antennas in turn.

20. The wireless communication device of claim 19, wherein any two second T ports operable at the same frequency band are coupled with different P ports of the four P ports;

each of the four P ports is coupled with a corresponding antenna of the four antennas;

the first T port at least supports a transmission function; and the three second T ports only support a reception function.

* * * * *